United States Patent
Chosak et al.

(10) Patent No.: US 7,424,167 B1
(45) Date of Patent: Sep. 9, 2008

(54) TIDE FILTERING FOR VIDEO SURVEILLANCE SYSTEM

(75) Inventors: Andrew J. Chosak, Arlington, VA (US);
Péter L. Venetianer, McLean, VA (US);
Paul C. Brewer, Arlington, VA (US);
John I. W. Clark, Leesburg, VA (US);
Alan J. Lipton, Herndon, VA (US)

(73) Assignee: ObjectVideo, Inc., Reston, VA (US)

( * ) Notice: Subject to any disclaimer, the term of this patent is extended or adjusted under 35 U.S.C. 154(b) by 813 days.

(21) Appl. No.: 10/954,479

(22) Filed: Oct. 1, 2004

(51) Int. Cl.
*G06K 9/40* (2006.01)
(52) U.S. Cl. ..................... 382/263; 382/266
(58) Field of Classification Search ............ 382/263, 382/266, 271
See application file for complete search history.

(56) References Cited

U.S. PATENT DOCUMENTS

| | | | | |
|---|---|---|---|---|
| 4,847,786 A | * | 7/1989 | Wang et al. | 382/171 |
| 5,229,850 A | * | 7/1993 | Toyoshima | 348/153 |
| 5,742,704 A | * | 4/1998 | Suzuki et al. | 382/176 |
| 5,774,578 A | * | 6/1998 | Shimizu | 382/170 |
| 5,862,245 A | * | 1/1999 | Renouard et al. | 382/113 |
| 6,259,802 B1 | * | 7/2001 | Jolly et al. | 382/103 |
| 6,445,409 B1 | * | 9/2002 | Ito et al. | 348/155 |
| 6,931,144 B2 | * | 8/2005 | Perrier | 382/100 |
| 6,987,883 B2 | * | 1/2006 | Lipton et al. | 382/173 |
| 7,177,445 B2 | * | 2/2007 | Brodsky | 382/103 |
| 7,181,047 B2 | * | 2/2007 | Pirim | 382/107 |
| 2004/0027494 A1 | * | 2/2004 | Thomas | 348/700 |
| 2007/0098221 A1 | * | 5/2007 | Florin et al. | 382/103 |

* cited by examiner

*Primary Examiner*—Andrew W. Johns
*Assistant Examiner*—Jeffrey S Smith
(74) *Attorney, Agent, or Firm*—Venable LLP; Michael A. Sartori

(57) ABSTRACT

A machine-accessible medium containing software code that, when read by a computer, causes the computer to perform method for filtering a video in a video system. The method may include generating a foreground mask and a background model from a video, where the foreground mask comprises moving pixels in the video and the background model comprises a statistical description, including a mean and a variance value, for each pixel in the video. Then the background model variance is filtered with a one-dimensional high pass filter in a single orientation. Next, for each linear grouping of pixels in the single orientation of the filtered variance, a first edge pixel is detected between a high-variance group of pixels and a low-variance group of pixels. Then a first waterline position is detected as an area bounded by the first edge pixels.

28 Claims, 9 Drawing Sheets

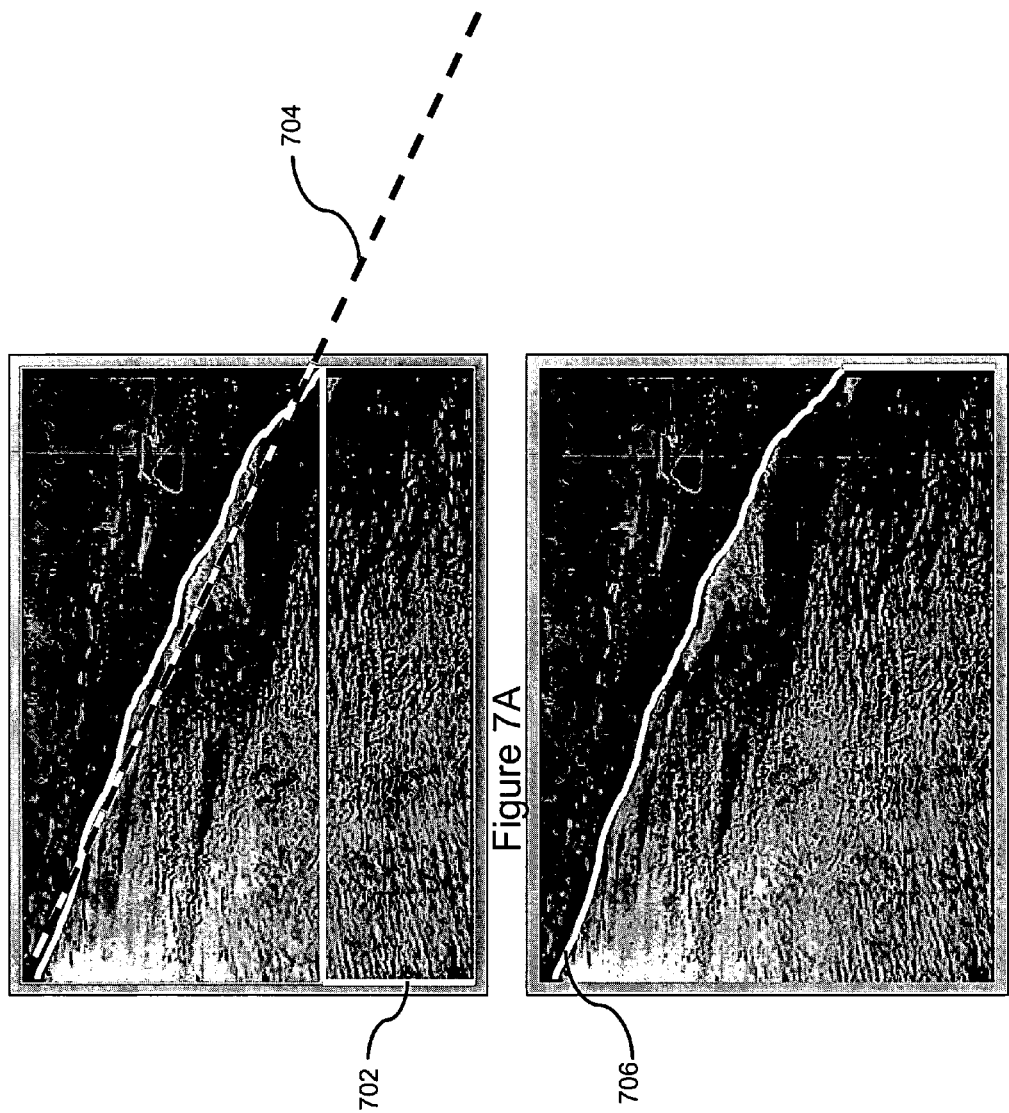

TIDE FILTERING FOR VIDEO SURVEILLANCE SYSTEM

BACKGROUND OF THE INVENTION

1. Field of the Invention

The present invention relates generally to surveillance systems, and more particularly to intelligent video surveillance systems.

2. Related Art

In a conventional intelligent video surveillance (IVS) system, automatic scene analysis is performed to extract and track all the possible surveillance targets in the camera field of view. The trajectories and behaviors of these targets are then analyzed, and alerts are sent once the trajectories and behaviors of the targets trigger user-defined rules.

As seen in FIG. 1, a conventional intelligent video surveillance (IVS) system may perform the processing steps of: background model maintenance 102, object detection 104, object tracking 106, and object classification 108. For further description of an exemplary IVS system. See, e.g., commonly owned U.S. patent application Ser. No. 09/987,707, which is incorporated herein by reference.

The background model maintenance step 102 monitors each pixel over time, remembering each pixel's typical appearance, and marks pixels different from the typical value as foreground. The object detection step 104 spatially groups these foreground pixels into foreground objects. Object tracking 106 connects these foreground objects temporally. Object classification 108 aims to categorize the tracked objects.

Referring now to step 102, there are at least two reasons that a pixel may be classified as foreground. First, the pixel could be part of a real moving object of interest (e.g. a person, a vehicle, or an animal). Second, the changes in the pixel could be caused by moving background (e.g. water, or foliage moving in the wind). Objects in the latter category, also called spurious foreground, can cause false alarms in the IVS system, thus detecting and eliminating these objects is very important. Certain spurious objects exhibit distinctly different motion and shape properties from real objects, and thus can be classified based on these properties as spurious. However, the motion and shape properties of other types of spurious objects may be very similar to those of real objects: they move consistently, without significant changes in size or shape.

Waves along the shoreline are a typical example of this behavior. As illustrated in FIGS. 2A-2C, a wave, for example, as seen in box 204, may be tracked consistently for several frames 202a, 202b, 202c, without significant change in size, shape or speed.

The performance of an IVS system is mainly measured by the detection rate and false alarm rate. A false alarm occurs when the IVS falsely identifies something in the video scene as being a target. In many cases, false alarms are triggered by spurious moving objects, such as, for example, waving tree branches, blowing leaves, and water ripples.

In video surveillance applications of scenes having a waterline, such as, for example, lakefront or beachfront, the tide is a large source of spurious objects that may trigger significant amount of false alarms.

What is needed then is an improved intelligent video surveillance system that overcomes shortcomings of conventional solutions.

SUMMARY OF THE INVENTION

In an exemplary embodiment of the present invention a system, method and computer program product for tide filtering for a video surveillance system is disclosed.

In an exemplary embodiment, the present invention may be a machine-accessible medium containing software code that, when read by a computer, causes the computer to perform the method comprising: generating a foreground mask and a background model from a video, wherein the foreground mask comprises moving pixels in the video and the background model comprises a statistical description, including a mean and a variance value, for each pixel in the video; filtering the background model variance with a one-dimensional high pass filter in a single orientation; for each linear grouping of pixels in the single orientation of the filtered variance, detecting a first edge pixel between a high-variance group of pixels and a low-variance group of pixels; and detecting a first waterline position as an area bounded by the first edge pixels.

In another exemplary embodiment, the present invention may be a system for filtering in a video system, comprising: a background segmentation module adapted to generate a foreground mask and a background model from a video, wherein the foreground mask comprises moving pixels in the video and the background model comprises a statistical description, including a mean and a variance value, for each pixel in the video; and a tide-detection module adapted to filter the background model variance with a one-dimensional high pass filter in a single orientation, to detect for each linear grouping of pixels in the single orientation in the filtered variance a first edge pixel between a high-variance group of pixels and a low-variance group of pixels, and to detect a first waterline position as an area bounded by the first edge pixels.

In another exemplary embodiment, the present invention may be a method for filtering a video in a video system, comprising: generating a foreground mask and a background model from a video, wherein the foreground mask comprises moving pixels in the video and the background model comprises a statistical description, including a mean and a variance value, for each pixel in the video; filtering the background model variance with a one-dimensional high pass filter in a single orientation; for each linear grouping of pixels in the single orientation of the filtered variance, detecting a first edge pixel between a high-variance group of pixels and a low-variance group of pixels; and detecting a first waterline position as an area bounded by the first edge pixels.

Further features and advantages of the invention, as well as the structure and operation of various embodiments of the invention, are described in detail below with reference to the accompanying drawings.

BRIEF DESCRIPTION OF THE DRAWINGS

The foregoing and other features and advantages of the invention will be apparent from the following, more particular description of exemplary embodiments of the invention, as illustrated in the accompanying drawings wherein like reference numbers generally indicate identical, functionally similar, and/or structurally similar elements. The left most digits in the corresponding reference number indicate the drawing in which an element first appears.

FIG. 7A shows an example where the water fully covers some image rows, causing an incorrect waterline detection;

FIG. 7B shows the corrected waterline for FIG. 7A;

DEFINITIONS

Figure 1:
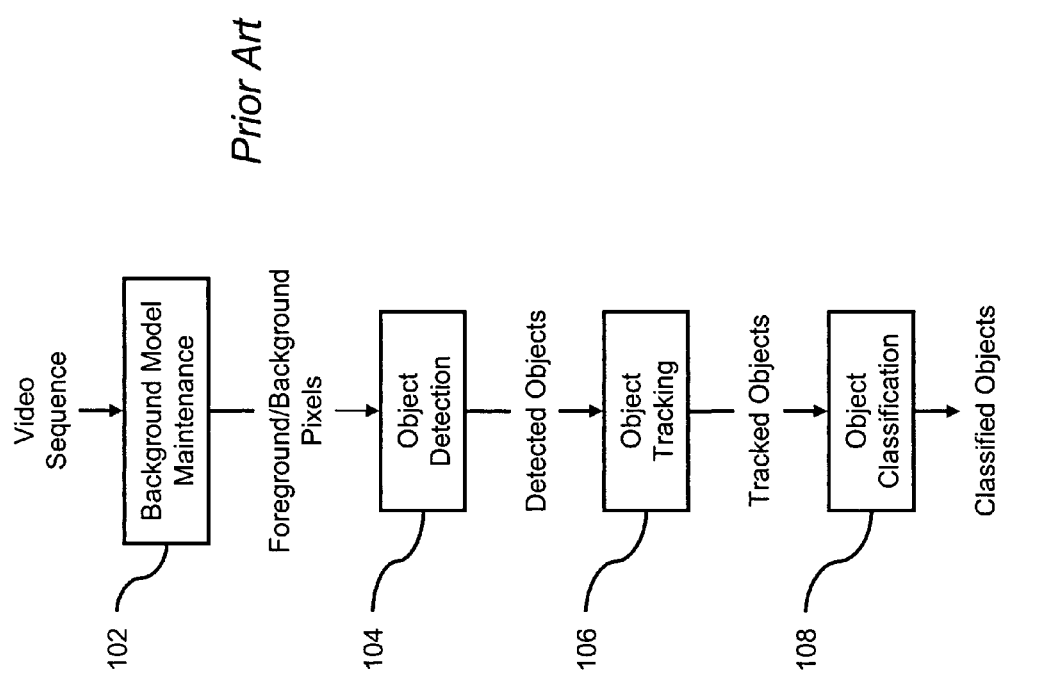
FIG. 1 depicts a flowchart of a content analysis process of a conventional IVS system.
Figure 2C:
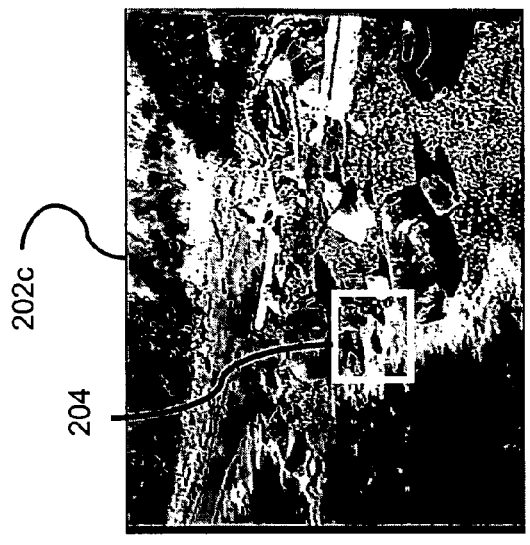
FIGS. 2A-C illustrate how a wave can be tracked consistently from frame to frame, causing potential false alarms.
Figure 2B:
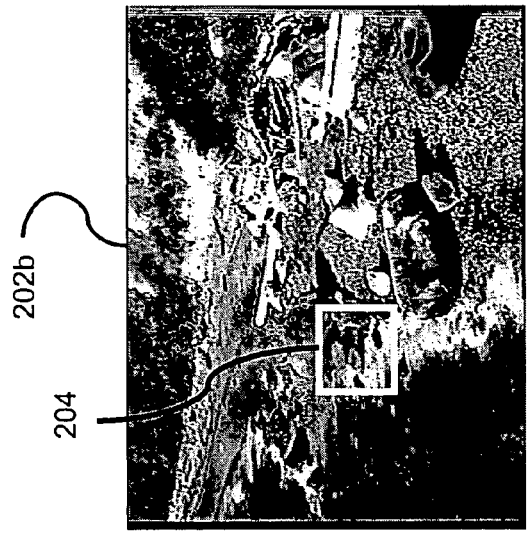
Figure 2A:
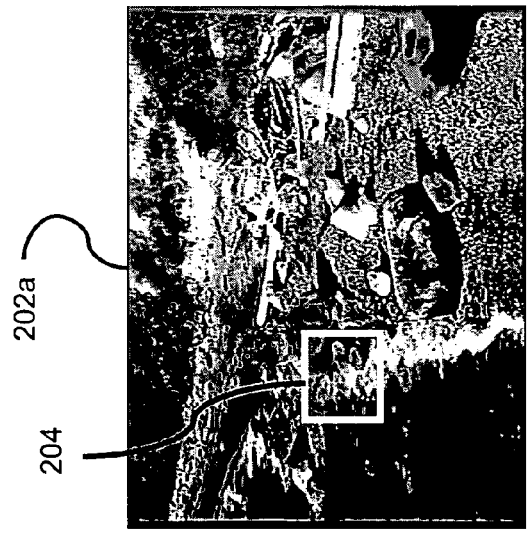

The following definitions are applicable throughout this disclosure, including in the above.

A "video" refers to motion pictures represented in analog and/or digital form. Examples of video include: television, movies, image sequences from a video camera or other observer, and computer-generated image sequences.

A "frame" refers to a particular still image or other discrete unit within a video.

An "object" refers to an item of interest in a video. Examples of an object include: a person, a vehicle, an animal, and a physical subject.

A "target" refers to the computer's model of an object. The target is derived from the image processing, and there is a one to one correspondence between targets and objects.

A "computer" refers to any apparatus that is capable of accepting a structured input, processing the structured input according to prescribed rules, and producing results of the processing as output. The computer can include, for example, any apparatus that accepts data, processes the data in accordance with one or more stored software programs, generates results, and typically includes input, output, storage, arithmetic, logic, and control units. Examples of a computer include: a computer; a general purpose computer; a supercomputer; a mainframe; a super mini-computer; a mini-computer; a workstation; a micro-computer; a server; an interactive television; a web appliance; a telecommunications device with internet access; a hybrid combination of a computer and an interactive television; a portable computer; a personal digital assistant (PDA); a portable telephone; and application-specific hardware to emulate a computer and/or software, for example, a programmable gate array (PGA) or a programmed digital signal processor (DSP). A computer can be stationary or portable. A computer can have a single processor or multiple processors, which can operate in parallel and/or not in parallel. A computer also refers to two or more computers connected together via a network for transmitting or receiving information between the computers. An example of such a computer includes a distributed computer system for processing information via computers linked by a network.

A "machine-accessible medium" refers to any storage device used for storing data accessible by a computer. Examples of a computer-readable medium include: a magnetic hard disk; a floppy disk; an optical disk, such as a CD-ROM and a DVD; a magnetic tape; a memory chip; and a carrier wave used to carry computer-readable electronic data, such as those used in transmitting and receiving e-mail or in accessing a network.

"Software" refers to prescribed rules to operate a computer. Examples of software include: software; code segments; instructions; software programs; computer programs; and programmed logic.

A "computer system" refers to a system having a computer, where the computer comprises a computer-readable medium embodying software to operate the computer.

An "information storage device" refers to an article of manufacture used to store information. An information storage device has different forms, for example, paper form and electronic form. In paper form, the information storage device includes paper printed with the information. In electronic form, the information storage device includes a computer-readable medium storing the information as software, for example, as data.

DETAILED DESCRIPTION OF EMBODIMENTS OF THE PRESENT INVENTION

An exemplary embodiment of the invention is discussed in detail below. While specific exemplary embodiments are discussed, it should be understood that this is done for illustration purposes only. A person skilled in the relevant art will recognize that other components and configurations can be used without parting from the spirit and scope of the invention.

Figure 3:
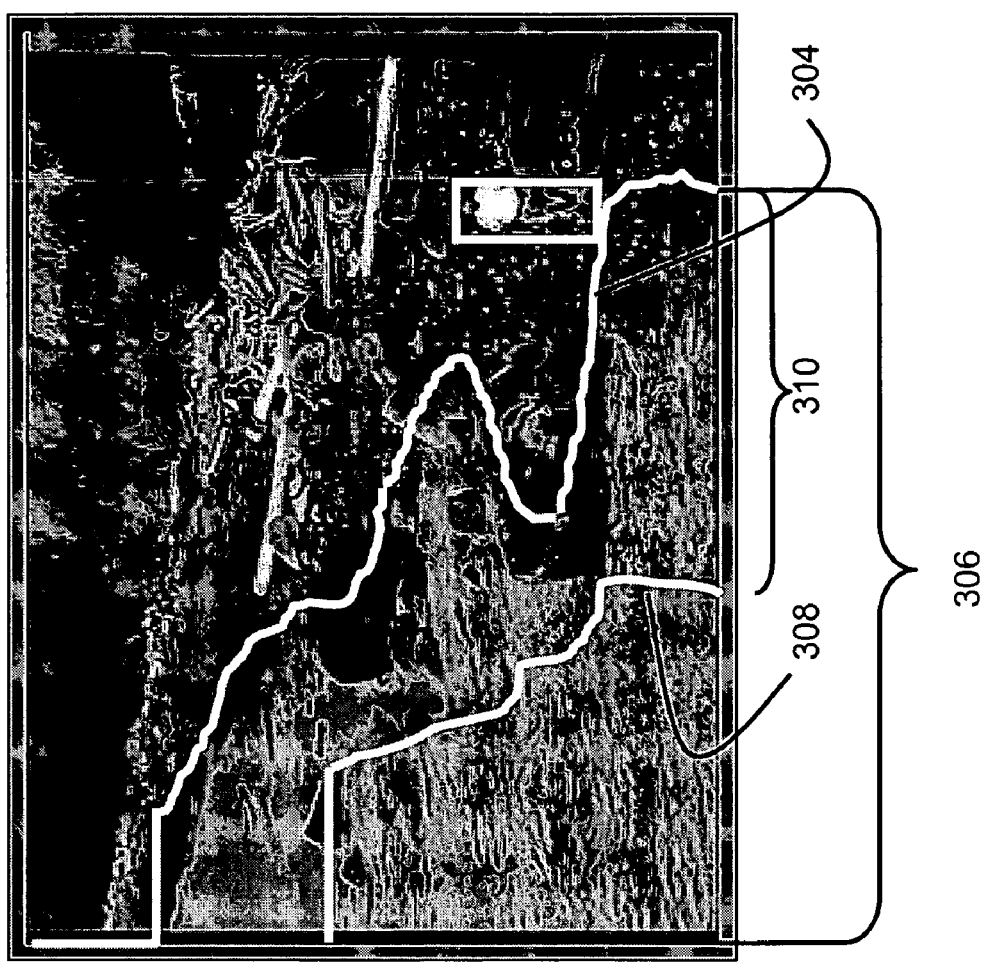
FIG. 3 depicts an exemplary image of a shoreline with the detected land-water boundary and the water area.

In an exemplary embodiment, the present invention may prevent false alarms caused by spurious foreground objects by detecting the waterline 304 and water area 306 as illustrated, for example, in FIG. 3, and excluding them from further processing. In addition, both the leading 304 and trailing 308 edge of the swash zone 310 may be detected and excluded, while still operating normally on the calm water area.

Figure 4:
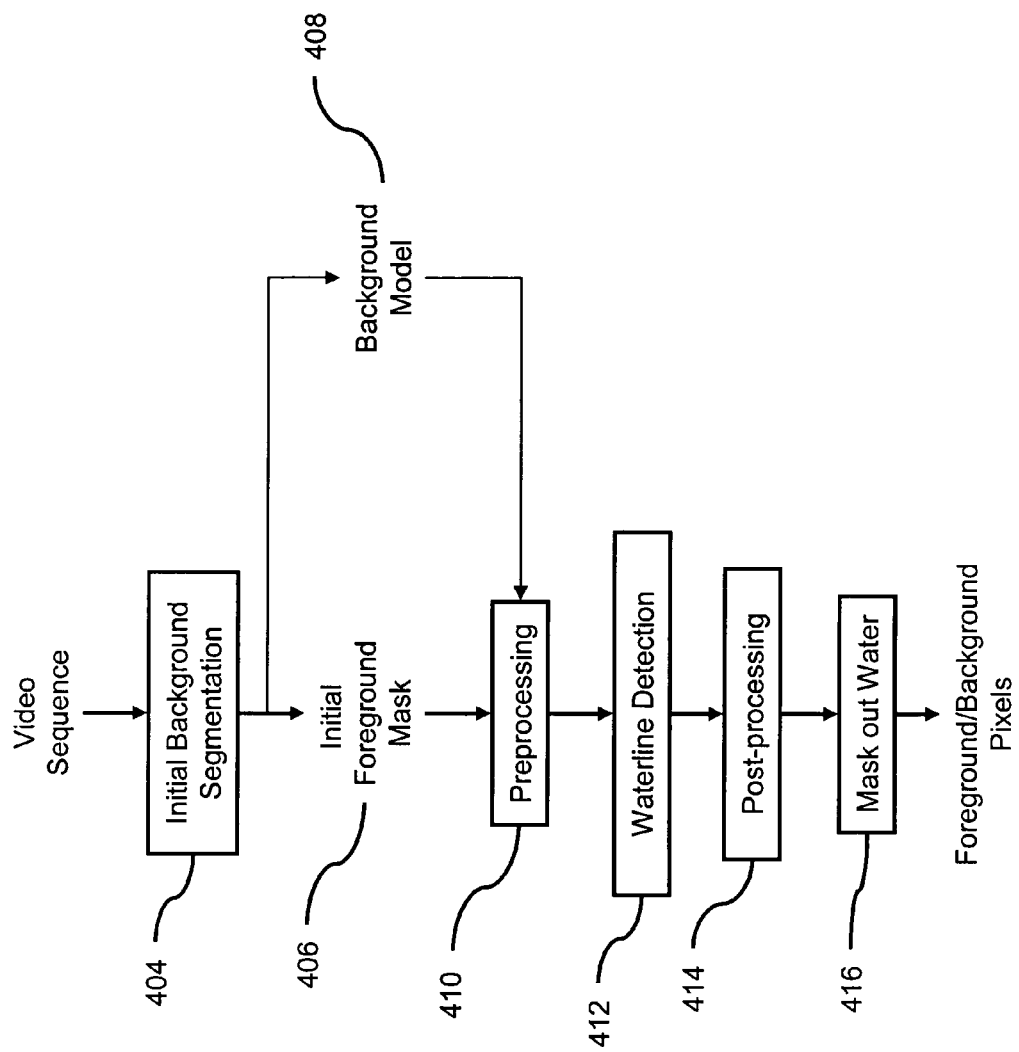
FIG. 4 depicts a flow chart of an exemplary background maintenance process according to an exemplary embodiment of the present invention.

As seen in FIG. 4, an exemplary embodiment of the present invention may detect the waterline during an improved background model maintenance step that replaces background model maintenance step 102. The initial background segmentation is performed in block 404. Initial background segmentation may include a change detection step and a motion detection step. Change detection may be performed, for example, by a stochastic background modeling technique, such as, for example, the dynamically adaptive background subtraction described in U.S. patent application Ser. No. 09/694,712, of common ownership and which is incorporated by reference in its entirety. Motion detection may be performed, for example, by three-frame differencing as described in U.S. patent application Ser. No. 09/987,707, of common ownership and which is incorporated by reference in its entirety. The outputs of the change detection and motion detection may be combined to provide a foreground motion mask. The output of the initial background segmentation is an initial foreground/background mask 406 describing which pixels are part of the foreground (i.e. moving) and which are background, and a background model 408, which includes a statistical description, e.g., the mean and variance, of the background value at every pixel.

In preprocessing 410, the video is prepared for waterline detection. Preprocessing 410 may include optionally sub-sampling the image, the corresponding foreground mask and background model. Preprocessing 410 may also include rotating the image, the corresponding foreground mask and background model, based on the known direction from which the water enters the frame, so that the water comes from a single orientation, e.g., the left or the right, not from the top or the bottom or any other location. The primary goal of both the sub-sampling and the orientation adjustment step is to speed up processing by working on a smaller image and by allowing more efficient row-wise pixel processing instead of column-wise processing. However, the invention need not be thusly limited, and there also may be embodiments of the invention in which column-wise processing is more efficient than, or as efficient as, row-wise processing.

As illustrated, for example, in FIG. 3, the water typically enters the frame from one direction and covers one side of the image, e.g., the left side in FIG. 3. Once a surveillance camera is installed, this direction never changes. Further processing may be made simpler if this direction is known. There are several ways to determine the direction from which the water is coming. For example, the user may specify the direction as part of the installation procedure for the IVS camera. Alternatively, the system may detect the direction automatically. For example, the system may detect which direction the water enters the frame by monitoring the background model around the frame boundaries over time and if the variance values at one edge of the frame are consistently higher than at other edges, that side is taken as the direction of water.

Following any preprocessing, the waterline and the water itself are detected in block 412. As seen, for example, in FIG. 5A, in a typical scenario the water enters a frame from one side, and from that direction the profile from side to side in the frame is: water area 502, turbulent swash zone 504, and land area 506. Lines 510 and 512 are provided for the reader's convenience and are not part of the video or the background model variance shown in FIG. 5B.

Figure 5A:
FIG. 5A shows a snapshot of a typical shoreline view.
Figure 5B:
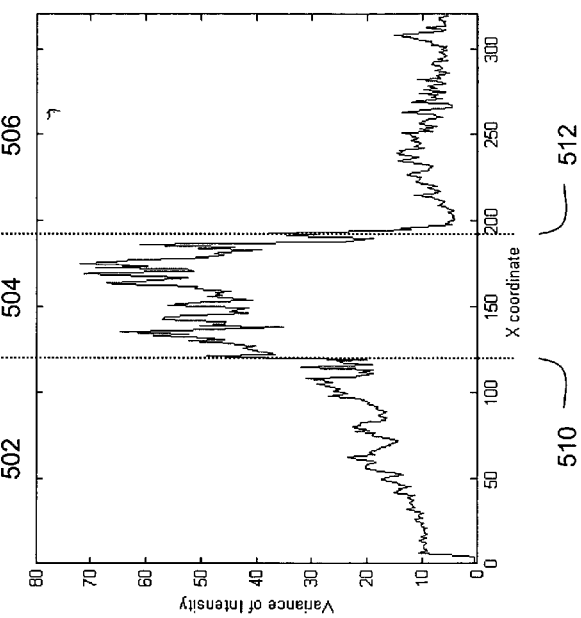
FIG. 5B shows a background model along the row marked with an arrow in FIG. 5A.

The background model variance of the row marked with arrow 508 in FIG. 5A is depicted in FIG. 5B: the variance of the calm water area 502 is moderate, that of the swash zone 504 is very high, and that of the land 506 is small.

Figure 6:
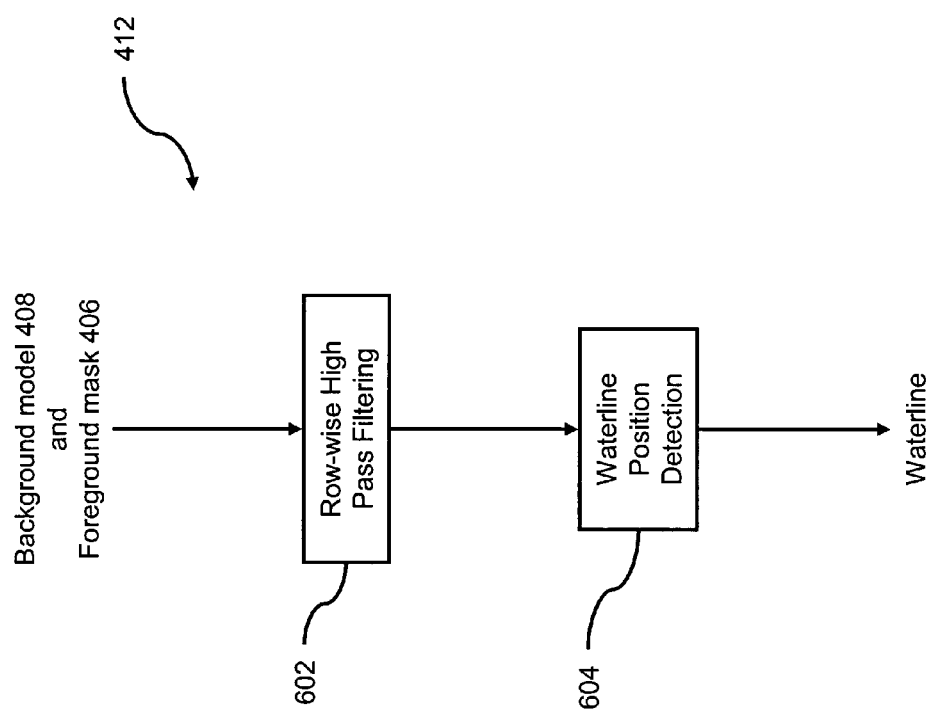
FIG. 6 depicts a flow chart of the waterline detection module process according to an embodiment of the invention.

The first step of the waterline detection 412 is to find the boundary between these distinct regions, in particular, the boundary between land and water. As seen in FIG. 6, in block 602, an exemplary embodiment of the present invention may filter the background variance image with a one-dimensional high pass filter in one orientation, for example, in the known direction of the water movement, e.g., row-wise, or some other linear grouping of pixels in the orientation. The land-water boundary in each row is detected in block 604 as the position with a large change in intensity from pixel to pixel in the given row. In an exemplary embodiment, the degree of change that constitutes a "large" change may be determined in part by the camera used, the environment of the scene, and the degree of sensitivity desired by the user. As a non-limiting example, the large change detected in FIG. 5B is a change in variance from about fifty to about ten. In general, the relative difference between low variance and high variance may be very situation-specific.

The land-water boundary detection step provides the initial estimate of the waterline boundary. For example, suppose that detection is being performed along row 508 from left to right, with the known orientation of the water being on the left. Then the last position with a large change, indicated by line 512, provides the initial estimate for the land-water boundary. Depending on the actual scenario and the needs of the application, the output of this step can provide either only the land-water boundary line 304, or both the land-water boundary 304 (which is also the leading boundary in FIG. 3) and trailing boundary 308 of the swash zone 310. If detection of the trailing boundary 308 is of interest, the initial estimate for boundary 308 is the first position from the direction of detection, e.g. from the left in FIGS. 3 and 5A, indicated by line 510.

Once the raw waterline is detected in block 412, additional post-processing may be done in block 414 to improve the quality of the detection. FIGS. 7 and 8 illustrate some situations that could require post-processing.

For example, as seen in FIG. 7A, at high-tide the water may cover the whole width of the image at certain portions of the view. Therefore, in the water-only area, indicated by line 702 at the left edge of the image, no boundary line is detected. In this situation, post-processing may detect areas where the water covers the full width of the image. This may be achieved in two steps. First, a line 704 is fitted to the detected waterline to predict the waterline in the area with no detection. As seen in FIG. 7A, the fitted line 704 indicates that the real waterline is expected to be beyond the right side of the image; hence water may cover the whole width of the bottom portion of the image.

Next, as a further verification that the area shown under the horizontal portion of line 702 ("area 702") is indeed water, a representative measure of the pixels in area 702 is compared to both water area pixels and land area pixels in other rows, and if these measurements confirm that area 702 is water, the detected waterline is corrected, to line 706, to include the full water area. For example, the average background model variance of rows in area 702 may be compared to the average background model variance of the land areas and the average background model variance of the water areas in the rows above area 702. If the average background model variance of the rows in area 702 is similar to that of the other water areas, the rows in area 702 are determined to be water.

Alternatively, the average intensity on either side of the detected waterline may be computed, and a separate intensity histogram may be generated for pixels on both sides of the detected waterline. The histogram peaks correspond to the water and land area, respectively. Then, the average intensity of area 702 is compared, row by row, to the expected average intensities. If the computed average intensity in area 702 is closer to the average intensity expected from the water than to the average intensity expected from the land, the whole row is determined to be water.

Figure 8A:
FIG. 8A shows an example of how an object can cause an incorrect waterline detection.
Figure 8B:
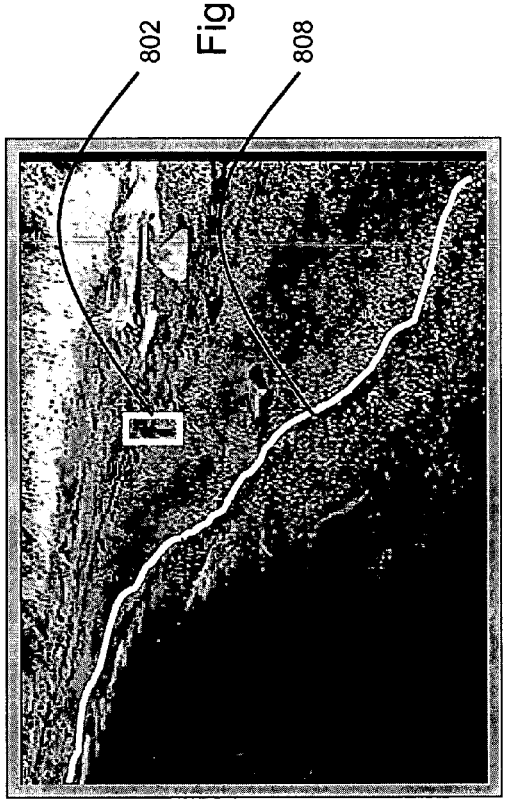
FIG. 8B shows the corrected waterline for FIG. 8A.

Another potential problem is illustrated in FIGS. 8A and 8B. If a legitimate object 802 moves around a lot in place, the corresponding background model variance will increase, and thus the legitimate object 802 will look as if it were part of the water. As a result, the detected waterline 804 may be pushed out to include the object 802 as well. Alternatively, the waterline may be genuinely extremely irregular.

Such outliers may be detected by fitting a line 806 to the detected waterline, and detecting areas where the discrepancy between the fitted line and the waterline is big. In those areas, the background variance of the extra area is compared with that of land and water areas. If the background variance of the extra area is similar to the variance of the land area, it may mean that the large protuberance in waterline 804 is caused by a separate object, not by a genuinely protruding waterline. The true waterline may be found by searching for additional peaks in the high-pass filtered row variance. Additional peaks that more closely match the fitted line are then chosen. As a result, the detected waterline will include only the water area bounded by the adjusted waterline 808 and the previously merged object 802 may be detected as a separate object.

Finally the post-processing can also include spatio-temporal filtering to smooth the waterline further.

After the waterline, or waterlines in the case of both leading and trailing edge of the swash zone, is detected, the corresponding water/swash area may be excluded from the foreground mask in step 416, so that the subsequent processing steps 104, 106 and 108 may proceed without having to respond to spurious objects caused by the water.

In an exemplary embodiment, the methods described above may be performed by a computer or computer system which may receive a video from a video surveillance camera or another video source. The computer or computer system may be an IVS system or may be a component of an IVS system.

Figure 9:
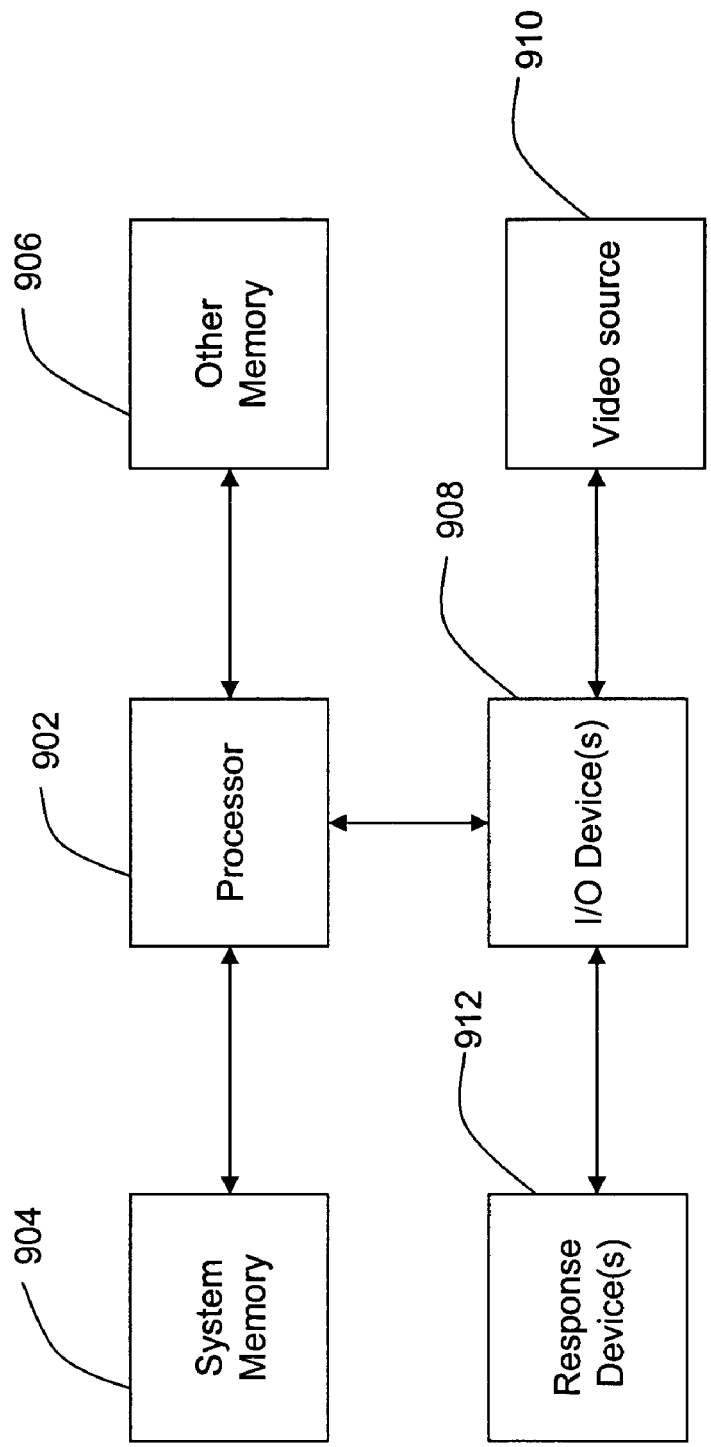
FIG. 9 illustrates an exemplary computer.

Some embodiments of the invention, as discussed above, may be embodied in the form of software instructions on a machine-readable medium. Such an embodiment is illustrated in FIG. 9. The computer system of FIG. 9 may include at least one processor 902, with associated system memory 904, which may store, for example, operating system software and the like. The system may further include additional memory 906, which may, for example, include software instructions to perform various applications. System memory 904 and additional memory 906 may be, for example, random access memory, or non-removable media such as, e.g., a hard disk. The system may also include one or more input/output (I/O) devices 908, for example (but not limited to), keyboard, mouse, trackball, printer, display, network connection, etc. The present invention may be embodied as software instructions that may be stored in system memory 904 or in additional memory 906. Such software instructions may also be stored in removable or remote media (for example, but not limited to, compact disks, floppy disks, etc.), which may be read through an I/O device 908 (for example, but not limited to, a floppy disk drive). Furthermore, the software instructions may also be transmitted to the computer system via an I/O device 908, for example, a network connection; in such a case, a signal containing the software instructions may be considered to be a machine-readable medium. The computer system may further be coupled to a video source 910. Video source 910 may be, for example, a camera, a video tape, a DVD, or a hard drive.

Additionally, the system of FIG. 9 may include one or more response devices 912. Response devices 912 may be triggered by output form processor 902 in response to surveillance results. Such response devices may include, but are not limited to, for example, lights, alarms, barriers, etc. Therefore, the system may serve to detect and respond to threats, such as terrorist activities.

While various embodiments of the present invention have been described above, it should be understood that they have been presented by way of example only, and not limitation. Thus, the breadth and scope of the present invention are not and should not be limited by any of the above-described exemplary embodiments, but should instead be defined only in accordance with the following claims and their equivalents.

What is claimed is:

1. A machine-accessible medium containing software code that, when read by a computer, causes the computer to perform a method for filtering a video in a video system, comprising:
   generating a foreground mask and a background model from a video, wherein said foreground mask comprises moving pixels in the video and said background model comprises a statistical description, including a mean and a variance value, for each pixel in the video;
   filtering said background model variance with a one-dimensional high pass filter in a single orientation;
   for each linear grouping of pixels in said single orientation of said filtered variance, detecting a first edge pixel between a high-variance group of pixels and a low-variance group of pixels; and
   detecting a first waterline position as an area bounded by said first edge pixels.

2. The machine-accessible medium of claim 1, wherein the software code causes the computer to perform the method further comprising:
   prior to filtering, determining a direction in which water in the video enters a frame of the video; and
   orienting the video such that said direction is substantially aligned with said single orientation.

3. The machine-accessible medium of claim 2, wherein said determining a direction comprises at least one of:
   automatically detecting said direction; or
   receiving user input designating said direction.

4. The machine-accessible medium of claim 3, wherein said automatic detecting comprises:
   monitoring said background model around boundaries of said frame over time; and
   if the variance values at one of said boundaries of said frame are consistently higher than at other said boundaries, choosing said one of said boundaries as said direction.

5. The machine-accessible medium of claim 1, wherein the software code causes the computer to perform the method further comprising:
   sub-sampling the video prior to said filtering.

6. The machine-accessible medium of claim 1, wherein the software code causes the computer to perform the method further comprising:
   correcting said first waterline position when no waterline is detected due to water covering at least one complete linear grouping of pixels in said single orientation of the video.

7. The machine-accessible medium of claim 6, wherein said correcting comprises:
   identifying at least one complete linear grouping of pixels in said single orientation where no waterline is detected;
   fitting a line to said first waterline; and
   determining whether said fitted line suggests that said at least one complete linear grouping of pixels in said single orientation is covered by water.

8. The machine-accessible medium of claim 7, wherein said determining comprises:
   determining a first representative measure of the variance of pixels on a first side of said edge pixels and a second representative measure of the variance of pixels on a second side of said edge pixels, wherein said first side is a known water area and said second side is a known land area;
   determining a third representative measure of the variance of pixels in said at least one complete linear grouping of pixels in said single orientation;
   comparing said third representative measure of the variance to said first representative measure of the variance and said second representative measure of the variance; and
   identifying said at least one complete linear grouping of pixels in said single orientation as being water when said third representative measure of the variance is more similar to said first representative measure of the variance than said second representative measure of the variance.

9. The machine-accessible medium of claim 7, wherein said determining comprises:
   generating a first intensity histogram for a first side of said edge pixels and a second intensity histogram for a second side of said edge pixels, wherein said first side is a known water area and said second side is a known land area;
   generating a third intensity histogram for said at least one complete linear grouping of pixels in said single orientation;
   comparing a peak of said third intensity histogram to a peak of said first intensity histogram and a peak of said second intensity histogram; and
   identifying said at least one complete linear grouping of pixels in said single orientation as being water when said peak of said third intensity histogram is more similar to said peak of said first intensity histogram than to said peak of said second intensity histogram.

10. The machine-accessible medium of claim 1, wherein the software code causes the computer to perform the method further comprising:

correcting said waterline position to remove an object included in a water area bounded by said detected waterline.

11. The machine-accessible medium of claim 10, wherein said correcting comprises:
fitting a line to said detected waterline;
detecting an object area wherein said fitted line and said detected waterline are substantially not in alignment;
comparing a background variance of said detected object area to a variance of a known land area and a variance of a known water area in the video;
identifying said detected object area as not being water when said variance of said detected object area is more similar to the variance of said known land area;
repeating said edge pixel detection for each linear grouping of pixels in said single orientation containing said detected object area to find a second edge pixel for each said row; and
correcting said detected waterline with said second edge pixels.

12. The machine-accessible medium of claim 1, wherein the software code causes the computer to perform the method further comprising: spatial and temporal filtering to smooth said detected waterline.

13. The machine-accessible medium of claim 1, wherein the software code causes the computer to perform the method further comprising:
using said detected waterline to remove pixels corresponding to water from said foreground mask.

14. The machine-accessible medium of claim 1, wherein the software code causes the computer to perform the method further comprising:
detecting a swash zone having a leading edge and a trailing edge; and
excluding said swash zone from said foreground mask.

15. The machine-accessible medium of claim 14, wherein said detecting a swash zone further comprises:
for each linear grouping of pixels in said single orientation of said filtered variance, detecting a second edge pixel between a low-variance group of pixels and a high-variance group of pixels;
detecting a second waterline position as an area bounded by said second edge pixels, wherein said swash zone lies between said first and said second waterlines.

16. A system for filtering in a video system, comprising:
a background segmentation module adapted to generate a foreground mask and a background model from a video, wherein said foreground mask comprises moving pixels in the video and said background model comprises a statistical description, including a mean and a variance value, for each pixel in the video; and
a tide-detection module adapted to filter said background model variance with a one-dimensional high pass filter in a single orientation, to detect for each linear grouping of pixels in said single orientation in said filtered variance a first edge pixel between a high-variance group of pixels and a low-variance group of pixels, and to detect a first waterline position as an area bounded by said first edge pixels.

17. The system of claim 16, further comprising:
a pre-processing module adapted to perform at least one of:
sub-sampling the video; or
determining a direction in which water in the video is moving and orienting the video such that the water is moving substantially in said single orientation.

18. The system of claim 16, further comprising:
a post-processing module adapted to perform at least one of:
correcting said waterline position to remove an object included in a water area bounded by said detected waterline; or
identifying at least one complete linear grouping of pixels in said single orientation of the video as being water.

19. The system of claim 16, further comprising:
a spatial and temporal filtering module adapted to smooth said detected waterline.

20. The system of claim 16, further comprising:
a masking module adapted to use said detected waterline to remove pixels corresponding to water from said foreground mask.

21. The system of claim 20, wherein said tide-detection module is further adapted to detect a swash zone having a leading edge and a trailing edge; and wherein said masking module is adapted to exclude said swash zone from said foreground mask.

22. A method for filtering a video in a video system, comprising:
generating a foreground mask and a background model from a video, wherein said foreground mask comprises moving pixels in the video and said background model comprises a statistical description, including a mean and a variance value, for each pixel in the video;
filtering said background model variance with a one-dimensional high pass filter in a single orientation;
for each linear grouping of pixels in said single orientation of said filtered variance, detecting a first edge pixel between a high-variance group of pixels and a low-variance group of pixels; and
detecting a first waterline position as an area bounded by said first edge pixels.

23. The method of claim 22, further comprising:
prior to filtering, determining a direction in which water in the video enters a frame of the video; and
orienting the video such that said direction is substantially aligned with said single orientation.

24. The method of claim 22, further comprising:
sub-sampling the video prior to said filtering.

25. The method of claim 22, further comprising:
correcting said first waterline position when no waterline is detected due to water covering at least one complete linear grouping of pixels in said single orientation of the video.

26. The method of claim 22, further comprising:
spatial and temporal filtering to smooth said detected waterline.

27. The method of claim 22, further comprising:
using said detected waterline to remove pixels corresponding to water from said foreground mask.

28. The method of claim 22, further comprising:
detecting a swash zone having a leading edge and a trailing edge; and
excluding said swash zone from said foreground mask.

* * * * *